United States Patent [19]

Mergard et al.

[11] Patent Number: 5,941,968
[45] Date of Patent: Aug. 24, 1999

[54] COMPUTER SYSTEM FOR CONCURRENT DATA TRANSFERRING BETWEEN GRAPHIC CONTROLLER AND UNIFIED SYSTEM MEMORY AND BETWEEN CPU AND EXPANSION BUS DEVICE

[75] Inventors: James Oliver Mergard, Pflugerville; Michael S. Quimby; Carl K. Wakeland, both of Austin, all of Tex.

[73] Assignee: Advanced Micro Devices, Inc., Sunnyvale, Calif.

[21] Appl. No.: 08/837,120

[22] Filed: Apr. 14, 1997

[51] Int. Cl.$^6$ .................................................. G06F 13/36
[52] U.S. Cl. ............................ 710/128; 710/126; 710/52; 711/146
[58] Field of Search .................................... 395/308, 306, 395/872; 711/146; 710/128, 126, 52

[56] References Cited

U.S. PATENT DOCUMENTS

| | | | |
|---|---|---|---|
| 5,454,107 | 9/1995 | Lehman et al. | 395/480 |
| 5,613,162 | 3/1997 | Kabenjian | 395/842 |
| 5,678,009 | 10/1997 | Bains et al. | 395/305 |
| 5,748,203 | 5/1998 | Tang et al. | 345/521 |
| 5,761,454 | 6/1998 | Adusumilli et al. | 395/306 |
| 5,768,628 | 6/1998 | Priem | 395/882 |
| 5,812,789 | 9/1998 | Diaz et al. | 709/274 |
| 5,815,167 | 9/1998 | Muthal et al. | 345/512 |
| 5,859,989 | 1/1999 | Olarig et al. | 395/309 |

FOREIGN PATENT DOCUMENTS

| | | |
|---|---|---|
| 97/26604 | 7/1987 | WIPO . |
| 96/13775 | 5/1996 | WIPO . |

OTHER PUBLICATIONS

XP–002073097 Cyrix Announces the MediaGX Processor, published Jul. 29, 1998 (1 doublesided sheet).
XP–000597978 Kocsis, "Frame–buffer wars: new directions in PC graphics," EDN May 23, 1996, pp. 121–126; 128.

International Search Report PCT/US 98/06475 dated Aug. 13, 1998.

*Primary Examiner*—Thomas C. Lee
*Assistant Examiner*—Harold Kim
*Attorney, Agent, or Firm*—Conley, Rose & Tayon; Robert C. Kowert; Kevin L. Daffer

[57] ABSTRACT

A computer system is provided including a CPU, a graphics controller, system memory, data steering logic, a DMA controller and arbitration logic. The graphics controller and system memory are coupled to a high-speed data bus. Data accessed by the CPU, the DMA controller and the graphics controller is all stored in the system memory. The data steering logic is also coupled to the high-speed data bus and to a low-speed data bus, and to the CPU. The data steering logic is configured to selectively couple the CPU to either the high-speed data bus or the low-speed data bus, thereby accommodating data transfers between the CPU and a bus device connected to the slow-speed data bus concurrent with data transfers between the graphics controller and the system memory. The data steering logic may also accommodate data transfers by the DMA controller on the slow-speed data bus concurrent with graphics controller data transfers. The arbitration logic arbitrates for access to the system memory between the CPU, DMA controller and graphics controller. In an alternative mode, the data steering logic accommodates data transfers between the CPU and the system memory over both the high-speed and slow-speed buses as a single double width high speed bus. The CPU, graphics controller, DMA controller, data steering logic and arbitration logic as described above may all be included within a single integrated circuit device along with various PC compatibility cores, thus achieving a low-cost, low-space system without sacrificing overall performance.

26 Claims, 5 Drawing Sheets

COMPUTER SYSTEM FOR CONCURRENT DATA TRANSFERRING BETWEEN GRAPHIC CONTROLLER AND UNIFIED SYSTEM MEMORY AND BETWEEN CPU AND EXPANSION BUS DEVICE

BACKGROUND OF THE INVENTION

1. Field of the Invention

This invention relates to computer systems, and more particularly, to an integrated computer system having a unified system memory and improved bus concurrency.

2. Description of the Relevant Art

Typical computer systems include a central processing unit ("CPU") and system memory coupled to a high-speed system bus. Usually, a bus bridge device is employed to bridge the high-speed system bus to a lower-speed peripheral bus. Normally, slower-speed devices, such as modems, drive controllers, and network interfaces, are located on the low-speed bus. Also, in typical computer systems, a graphics controller is located on the high-speed bus. The graphics controller typically includes its own memory separate from the main system memory. This separate graphics memory is used to store screen image data for display on a monitor. Also typically included in modern computer systems is a DMA controller. The DMA controller allows for the direct transfer of data between system memory on the high-speed bus and peripheral bus devices on the low-speed bus.

Referring now to FIG. 1A, a block diagram of a typical prior art computer system 100 is shown. Computer system 100 includes system memory 112 and CPU 114, both coupled to the high-speed system bus 110. A graphics controller 132 is also coupled to the high-speed system bus 110. Bus bridge 120 couples the high-speed system bus 110 to a low-speed peripheral bus 130. One or more bus devices, such as bus device 134, may be coupled to the low-speed peripheral bus 130. Bus device 134 may be any type of bus device commonly found in computer systems, such as a modem device. Graphics controller 132 is connected to graphics memory 133. Also included in computer system 100 is DMA controller 122, which facilitates data transfers between bus device 134 and system memory 112.

System memory 112 typically comprises DRAM memory operating in fast page mode or extended data out (EDO) mode. System memory 112 stores data operated on by CPU 114. CPU 114 transfers data to and from system memory 112 over high-speed system bus 110. CPU 114 may also transfer data to and from bus device 134 through bus bridge 120. Furthermore, DMA controller 122 allows data to be transferred directly between bus device 134 and system memory 112.

Graphics controller 132 operates on data contained in graphics memory 133, which is memory separate from system memory 112. Graphics memory 133 is typically high-speed DRAM or VRAM memory. Graphics memory 133 contains data corresponding to the screen image displayed upon an external monitor. CPU 114 may also access graphics memory 133. However, graphics controller 132 only accesses graphics memory 133 and does not access system memory 112. Graphics controller 132 displays screen images by reading the screen image data stored in graphics memory 133 and converting the screen image data into analog monitor signals which create the screen image display on an external monitor.

An increasingly popular application of computer systems is in small hand-held, low-power, and low-cost computer devices. Thus, it is desirable to have a low-cost, low-power computer system that can be implemented in a small amount of space. One method of obtaining low cost, low power, small sized computer systems is to integrate as many of the computer system functions onto a single integrated circuit device as possible. Technological improvements in the feature size of integrated circuits in recent years have allowed many of the functions shown in computer system 100 to be integrated onto a single monolithic substrate. For example, CPU 114, bus bridge 120, DMA controller 122 and graphics controller 132 may all be integrated into a single device as shown by the dotted-line enclosure 140 in FIG. 1A.

However, such large scale integration poses serious problems. To achieve the goals of low cost and small space it is desirable to integrate the above listed components into as small an integrated circuit package as possible. However, the number of external connections, or pins, required often mandates that a very large and expensive package must be utilized in order to integrate the above components. For example, an IC device integrating the components enclosed by dotted-line 140 would require separate interfaces to graphics memory 133, to high-speed system bus 110 and system memory 112, and to low-speed bus 130. Providing interfaces to all of these external components will greatly increase the pin count of the integrated circuit device represented by dotted-line 140. Furthermore, separate memory controllers for system memory and graphics memory would be required, increasing the gate count (size) of the IC device. Therefore, in order to reduce the size and pin count of the integrated circuit device, it would be desirable to reduce the number of external data interfaces that must be supported. One solution to this problem is to employ a unified memory for both the main system memory and the graphics memory.

Referring now to FIG. 1B, a block diagram of a prior art computer system 150 utilizing a unified memory for both system memory and graphics memory is illustrated. Computer system 150 includes CPU 114 and unified memory 116, both coupled to high-speed system bus 110. Bus bridge 120 couples high-speed system bus 110 to low-speed peripheral bus 130. A bus device 134 is coupled to the low-speed peripheral bus 130. In contrast to computer system 100 of FIG. 1A, graphics controller 118 of computer system 150 in FIG. 1B is coupled to the high-speed system bus 110. Thus, in computer system 150 the CPU 114 and graphics controller 118 both access data in the unified memory 116. In other words, both CPU data and screen image data are stored in the unified memory 116.

The architecture of computer system 150 allows integration of many of the computer system components into a single integrated device, while requiring fewer external interfaces than the integrated device represented by dotted-line 140 in FIG. 1A. As shown by dotted-line 160 in FIG. 1B the CPU 114, graphics controller 118, bus bridge 120 and DMA controller 122 may all be integrated into a single device requiring external data interfaces only to low-speed bus 130 and to high-speed system bus 110 (system memory 116). By utilizing a unified memory architecture, the separate external interface to graphics memory 133 has been eliminated, thus saving numerous pins on the integrated circuit package. Furthermore, only a single memory controller is needed to interface to the unified system memory 116 as opposed to two memory controllers that would be needed if the CPU and graphics memory were separate. Therefore fewer gates and pins are required in the IC device supporting the unified memory architecture of computer system 150. Thus, a smaller, cheaper package may be used for the device.

However, a significant drawback is associated with the architecture of computer system 150. CPU 114, graphics controller 118, and DMA controller 112 must all share the high-speed system bus 110 in order to access the unified memory 116. Therefore, only one of these devices may access the unified memory 116 at a time. For example, if the CPU is currently performing a burst read operation from the unified memory 116, the graphics controller 118 must wait until the CPU access is completed before the graphics controller 118 may access the unified memory 116. This architecture can lead to serious performance bottlenecks. For example, when graphics controller 118 is performing a screen refresh operation, it must have continuous access to the unified memory 116 during the refresh operation. Otherwise, visible glitches would appear to the user on the external monitor. Therefore, during screen refresh operations the CPU and DMA controller are completely denied access to the unified memory 116, thereby severely impairing overall system performance. Likewise, if the DMA controller is performing a long DMA block transfer over the high-speed system bus 110 to the unified memory 116, the graphics controller 118 may have to wait an extended period of time before being able to perform a new screen refresh operation. If this period of time is too long, noticeable glitches will appear on the monitor to the user.

Therefore, it is desirable to have a computer system architecture which allows the CPU, DMA controller, bus bridge and graphics controller to be integrated into a single low-cost, small-sized device. It is further desired for such an integrated device to have as few as possible external interface connections without sacrificing overall system performance. It is also desirable for such a device to support advanced operating systems such as Windows® and GEOS.

SUMMARY OF THE INVENTION

The problems outlined above are in large part solved by a computer system in accordance with the present invention. In one embodiment, a computer system is provided that includes a central processing unit (CPU), a graphics controller, system memory, data steering logic, and memory arbitration logic. The graphics controller and system memory are both coupled to a high-speed data bus. Data accessed by the CPU and data accessed by the graphics controller are both stored in the system memory. The data steering logic is coupled to the high-speed data bus, coupled to a low-speed data bus, and coupled to the CPU. The data steering logic is configured to selectively couple the CPU to either the high-speed data bus, or to the low-speed data bus. Thus, the data steering logic is able to accommodate data transfers between the CPU and a device connected to the second data bus concurrently with data transfers between the graphics controller and the system memory. The memory arbitration logic is coupled to the graphics controller and to the CPU. This arbitration logic is configured to arbitrate for access to the system memory, thereby preventing bus contention on the high-speed data bus.

In another embodiment of the present invention, a direct memory access (DMA) controller is included in the computer system as described above. This DMA controller is coupled to the memory arbitration logic. In this embodiment, the memory arbitration logic and data steering logic are configured to accommodate the DMA controller accessing devices on the low-speed data bus concurrently with the graphics controller accessing the system memory. This embodiment may also include system arbitration logic coupled to the CPU and DMA controller. The system arbitration logic arbitrates between the CPU and the DMA controller for access to the system memory. The winner of this arbitration is indicated to the memory arbitration logic which then arbitrates between the winner and the graphics controller for ultimate access to the system memory. The system arbitration logic may be configured so that the CPU is the default arbitration winner. Thus, the system arbitration logic always indicates the CPU as the arbitration winner, unless the DMA controller asserts a bus request indication prompting system arbitration. Also, the memory arbitration logic may be configured so that the graphics controller has arbitration priority over the winner of the system arbitration. This priority scheme is desirable to ensure that the graphics controller may regularly access system memory in order to maintain a glitch free screen display.

In the embodiments described above, the CPU may comprise a cache memory. The cache memory is a small, high-speed memory located between the CPU and the high-speed data bus. This cache memory may supply data to the CPU concurrent with the graphics controller accessing system memory, thereby increasing overall system performance. If the data accessed by the CPU is not located within the cache memory, then the CPU must arbitrate for access to the system memory as described above.

Also, the graphics controller may comprise a FIFO memory. Similar to the cache memory in the CPU, the FIFO memory in the graphics controller improves overall system concurrency by allowing the graphics controller to access data from the FIFO memory while the CPU or DMA controller accesses the system memory. When the graphics controller is the owner of the high-speed data bus, it may access the system memory in order to fill its internal FIFO memory.

In another embodiment of the present invention, a single integrated circuit device is provided comprising a CPU, a graphics controller, data steering logic, and memory arbitration logic. The graphics controller is coupled to a high-speed data bus. This high-speed data bus also connects to system memory that is external from the integrated circuit device. Data accessed by the CPU and data accessed by the graphics controller are both stored in this external system memory. The data steering logic is coupled to the high-speed data bus, to an external low-speed data bus, and to the CPU. The data steering logic is configured to selectively couple the CPU to either the high-speed data bus or the external low-speed data bus. Thus, the data steering logic accommodates data transfers between the CPU and an external bus device coupled to the external low-speed data bus concurrent with data transfers between the graphics controller and the external system memory. The memory arbitration logic is configured to operate as described for the above embodiments.

Also, this embodiment may include a direct memory access (DMA) controller and system arbitration logic within the integrated circuit device. The DMA controller and system arbitration logic may operate as described for the embodiments above. Furthermore, the integrated circuit device of this embodiment may also include cache memory within the CPU and FIFO memory within the graphics controller. Moreover, the integrated circuit device may include a plurality of internal registers coupled to the data steering logic. These internal registers may serve to configure various PC compatibility cores also included within the integrated circuit device. The data steering logic may be further configured to accommodate data transfers between the CPU and the internal registers concurrent with data transfers between the graphics controller and the external system memory. Also, the integrated circuit device of this embodiment may include bus controller logic configured to provide control signals to support an ISA bus and a PCMCIA bus, wherein the low-speed external data bus provides the data signals for the ISA and/or PCMCIA bus.

The present invention achieves a computer system with improved bus concurrency. Furthermore, the present invention allows a CPU, DMA controller, bus bridge, and graphics controller to be integrated into a single, low cost, small size, integrated circuit device. This integrated circuit device requires only one memory interface without sacrificing overall system performance and is thus able to support modern operating systems such as Windows® or GEOS.

BRIEF DESCRIPTION OF THE DRAWINGS

Other objects and advantages of the invention will become apparent upon reading the following detailed description and upon reference to the accompanying drawings in which.

Figure 1A:
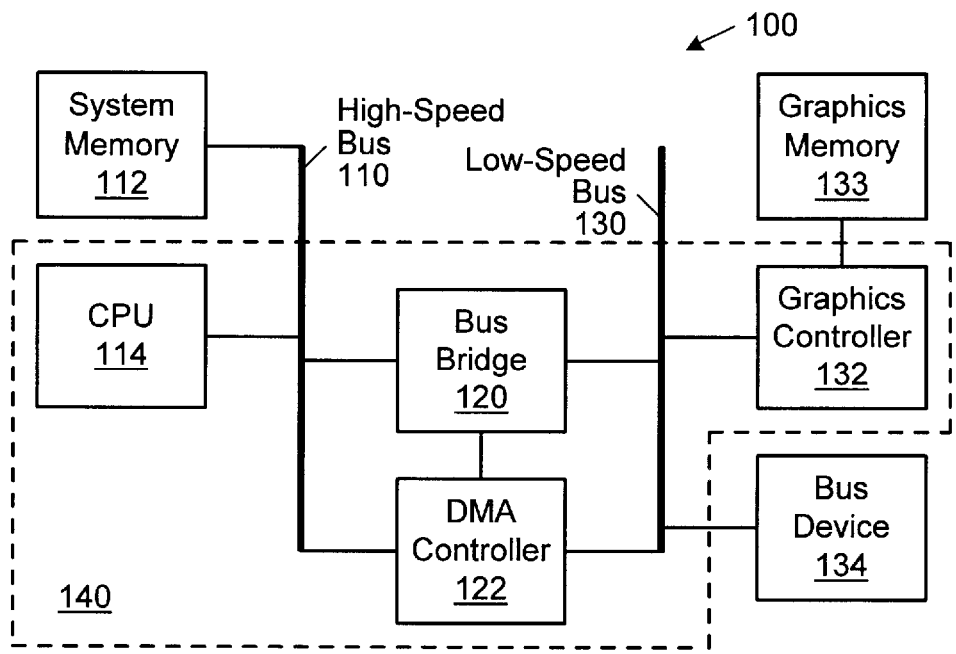
FIG. 1A is a block diagram of a prior art computer system.
Figure 1B:
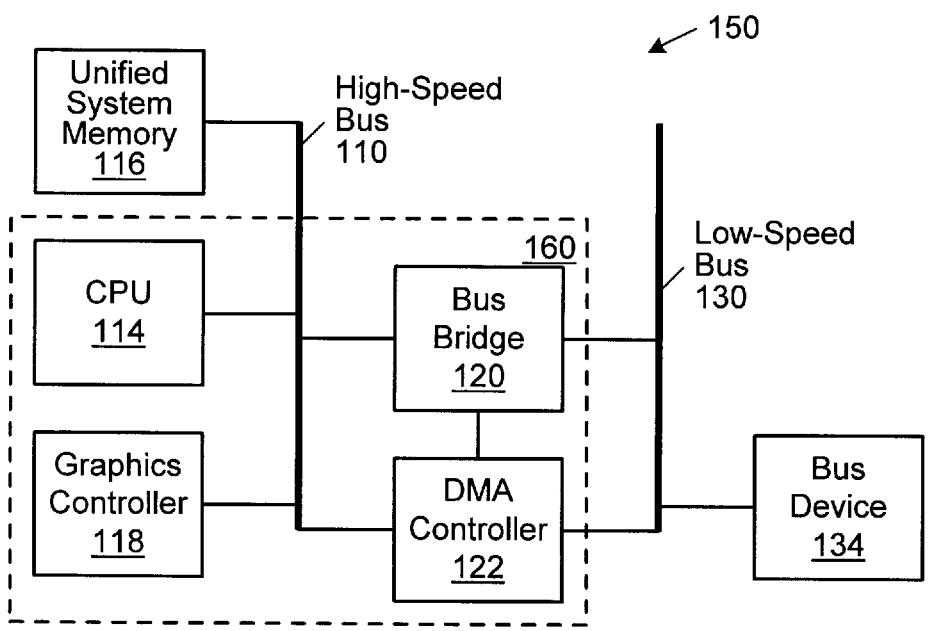
FIG. 1B is a block diagram of a prior art computer system employing a unified memory architecture.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
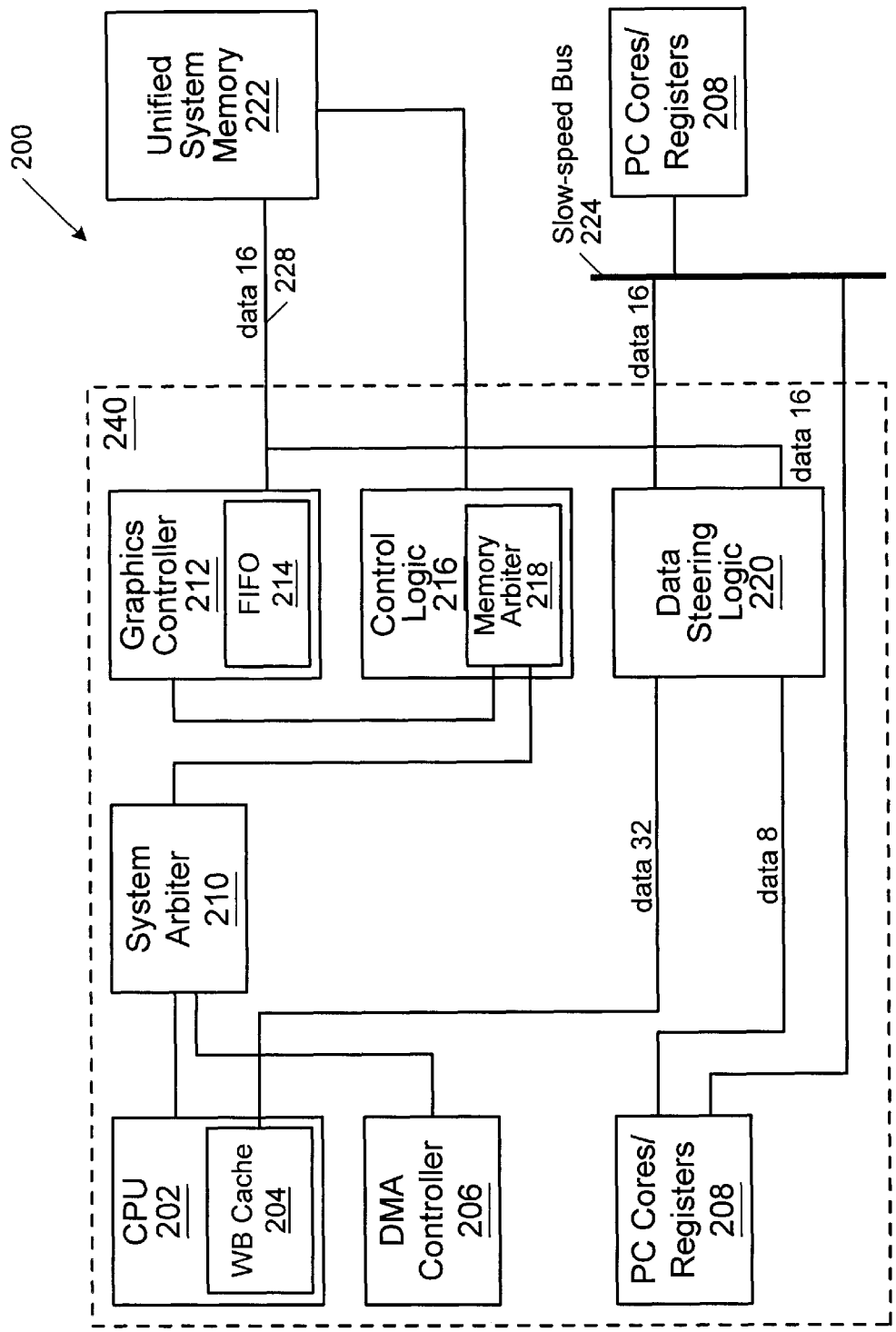
FIG. 2 is a block diagram of a computer system including data steering logic and arbitration logic according to one embodiment of the present invention.

Referring now to FIG. 2, a block diagram of a computer system incorporating data steering logic and bus arbitration logic in accordance with the present invention is shown. Computer system 200 is shown including a central processing unit (CPU) 202, DMA controller 206 and graphics controller 212. These three devices share access to unified system memory 222 through a 16 bit high-speed data bus 228. System arbiter 210 and memory arbiter 218 work together to control access to the unified system memory 222 and prevent contention on the high-speed data bus 228. The operation of the arbiter system comprising system arbiter 210 and memory arbiter 218 is discussed in further detail below.

Also included in computer system 200 is control logic 216 and data steering logic 220. Data steering logic 220 is coupled to the 32-bit CPU data bus and coupled to the 16 bit high-speed data bus 228. Also included in computer system 200 is a slow-speed bus 224 which may have one or more bus devices, such as bus device 226, coupled to it. The 16 bit data bus of the slow-speed bus 224 is coupled to data steering logic 220. Also coupled to data steering logic 220 is an 8 bit data bus which provides a data path to various control units and registers represented by PC Cores/Registers 208 in the illustration.

CPU 202 is illustrative of an X86 microprocessor such as an 80486® microprocessor, or other compatible microprocessor. It is understood, however, that a system according to the present invention may employ other types of microprocessors such as a RISC type microprocessor.

DMA controller 206 is illustrative of, for example, a PC compatible DMA controller, such as two 8237A compatible controllers as typically incorporated in IBM compatible PCs. However, it is understood that any type of direct memory access controller may be utilized in the present invention. DMA controller 206 functions to facilitate data transfers directly between devices connected to slow-speed bus 224 and the unified system memory 222. For example, DMA controller 206 obtains control of the high-speed data bus 228 and generates the necessary control signals to create memory transfers between bus device 226 and unified system memory 222 without intervention by CPU 202. Thus, DMA controller 206 provides for higher overall system performance by allowing devices located on slow-speed bus 224 to communicate directly with memory in one operation as opposed to two operations that would be required if the CPU 202 intervened.

Graphics controller 212 functions to create and manipulate visual screen images on an external monitor (not shown) to provide the user interface for computer system 200. The screen image is stored as data in unified system memory 222. The graphics controller 212 accesses the screen data in the unified system memory 222 in order to change and/or refresh the screen image. Screen refreshes are performed when the graphics controller 212 reads the screen image data from the unified system memory 222 and converts the data into analog signals which are sent to the external monitor to create the visual screen image. Graphics controller 212 may be similar to graphics controllers found in typical personal computers and may function to control CRT type external monitors or LCD type displays, among others.

Unified system memory 222 may comprise DRAM type memory operating in fast page mode or extended data out (EDO) mode. It is understood that other types of memory, such as SDRAM, may be utilized within the scope of the present invention. Unified system memory 222 is coupled to the graphics controller 212 and data steering logic 220 by high-speed data bus 228. Unified system memory 222 also receives address and control signals from control logic 216. Data accessed by CPU 202, graphics controller 212, and bus devices such as bus device 226, is all located in unified system memory 222. However, in some implementations other memory may be located on bus devices such as bus device 226, located on the slow-speed bus 224. This type of memory architecture, where the CPU and graphics controller both share the same physical memory, is often referred to as a shared memory architecture.

Slow-speed bus 224 supports an expansion type bus such as the Industry Standard Architecture (ISA) bus or the PCMCIA (PC Card) bus. Also, in some embodiments of the present invention, slow-speed bus 224 may support two or more such busses, such as both an ISA bus and a PCMCIA bus. One or more bus devices may be attached to slow-speed bus 224, as illustrated by bus device 226. These bus devices normally perform functions that do not require as much bandwidth to the system memory 222 as the CPU 202 and graphics controller 212 require. Such bus devices may include disk drive controllers, such as a SCSI controller, network controllers, modems, and other I/O devices. The terms "high-speed" referring to high-speed data bus 228 and "slow-speed" referring to slow-speed bus 224 are used only as terms for comparison. For example, in one embodiment of the present invention, high-speed bus 228 may operate at 33 MHz, while slow-speed bus 224 operates at 8 MHz. Thus, in such an embodiment, the rate at which data could be transferred would be roughly four times as great on high-speed data bus 228 as on slow-speed bus 224.

PC Cores/Registers 208 includes various control and functional units typically found in modern computer systems. For example, PC Cores/Registers 208 may include a programmable interrupt controller, a programmable interval timer, a real time clock, a UART, a keyboard controller, a parallel port controller, and/or other registers and functions required for the desired personal computer compatibility. The functional units located within PC Cores/Registers 208 are connected to the computer system through an 8-bit data bus which allows access by CPU 202. Also included in PC Cores/Registers are the controller functions which provide control signals for the slow-speed bus 224. For example, PC cores/register 208 may include an ISA controller and/or a PCMCIA controller. Furthermore, for portable and low-power computer applications, PC Cores/Registers 208 may include a power management unit. All of the functional units described above as included in PC Cores/Registers 208 may be functionally similar or equivalent to such functions typically found in PC type computer systems.

Figure 3:
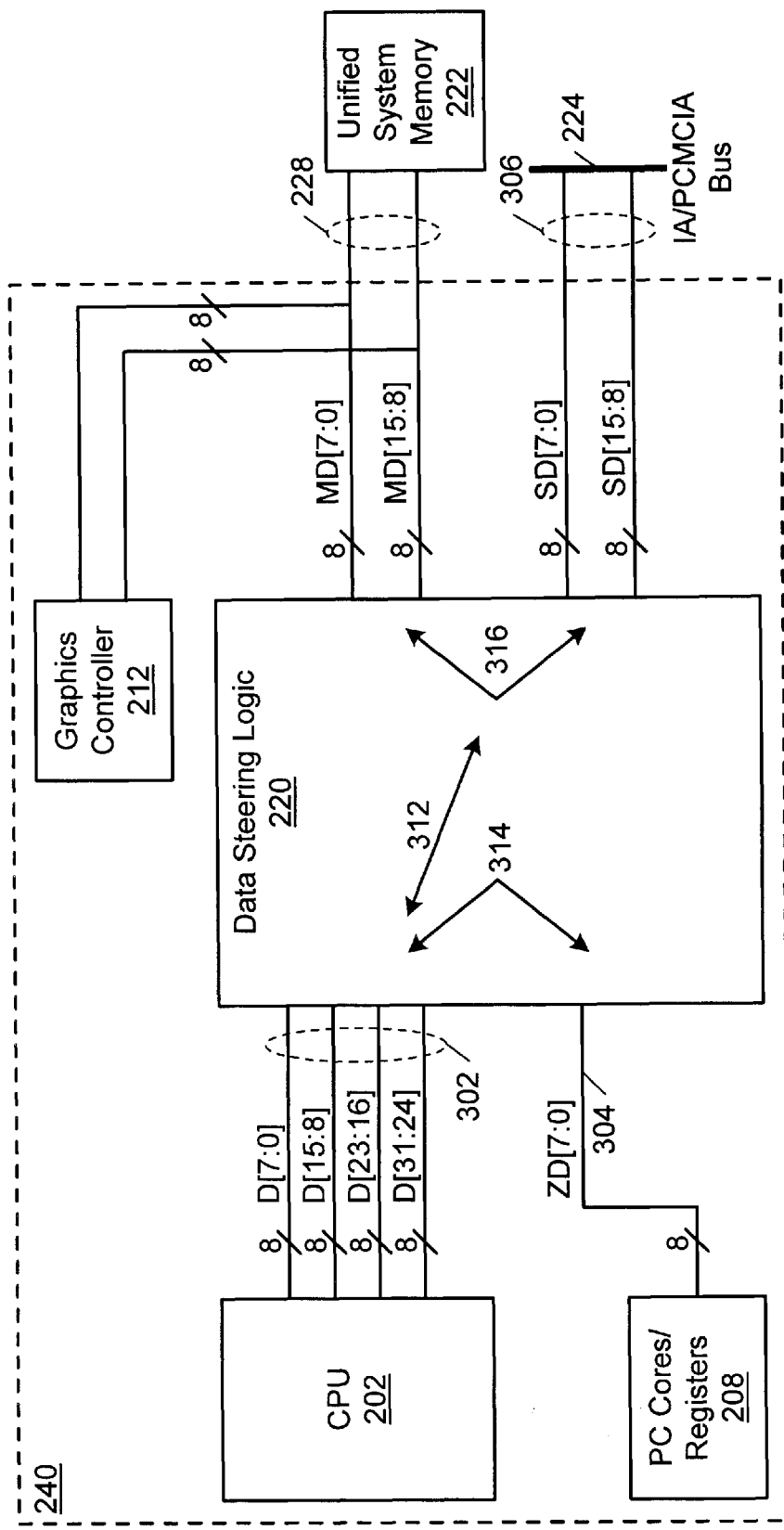
FIG. 3 is a detailed block diagram of the data paths of the computer system of FIG. 2.

Referring now to FIG. 3 a block diagram showing a more detailed illustration of the data paths in computer system 200 is shown. CPU 202 is coupled to the data steering logic 220 by four 8-bit data byte lanes 302. These byte lanes 302 form the 32 bit CPU data bus. PC Cores/Registers 208 is coupled to data steering logic 220 by an 8-bit data bus 304. Data steering logic 220 is also coupled to the high-speed data bus 228, which comprises two 8-bit byte lanes to form a 16-bit data path. The unified system memory 222, and the graphics controller 212, are also connected to these two byte lanes comprising the high-speed data path 228. Two 8-bit byte lanes 306 comprise the data portion of slow-speed bus 224. These two 8-bit byte lanes 306 form the 16-bit data bus portion of slow-speed bus 224. This data bus 306 is also coupled to data steering logic 220.

Data steering logic 220 provides data connections between the various system components of FIG. 3. Data steering logic 220 may also perform necessary byte gathering and/or byte lane steering. An important aspect of the data steering logic in the present invention is the ability to allow for CPU and DMA data transfers to be performed concurrent with graphics controller data transfers. For instance, the CPU 202 may execute from a ROM or FLASH device on the slow-speed bus 224 while the graphics controller accesses unified system memory 222. Data steering logic 220 may couple the CPU data bus 302 to the slow-speed data bus 306 as illustrated by path 312. Data steering, as shown by path 312 in data steering logic 220, allows data transfers to occur between CPU 202 and bus devices located on the slow-speed bus 224, while data transfers are concurrently performed between graphics controller 212 and unified system memory 222 over the high-speed data bus 228. Similarly, data steering path 314 allows data transfers between CPU 202 and the various PC Cores/Registers 208 to be performed concurrently with data transfers between graphics controller 212 and unified system memory 222.

Also, DMA transfers may occur through path 316 between unified system memory 222 and devices located on slow-speed bus 224, partially concurrent with data transfers between graphics controller 212 and unified system memory 222. Thus, it can be understood that data steering logic 220 provides data connections that allow data transfer operations to continue between system components during times when graphics controller 212 is accessing unified system memory 222. Therefore, the overall computer system performance is enhanced. Referring back to FIG. 2, data steering logic 220 is controlled by control signals generated in control logic 216. Control of data steering logic 220 is a function of the result of the arbitration system comprising system arbiter 210 and memory arbiter 218. This arbitration system is further described below.

Figure 4:
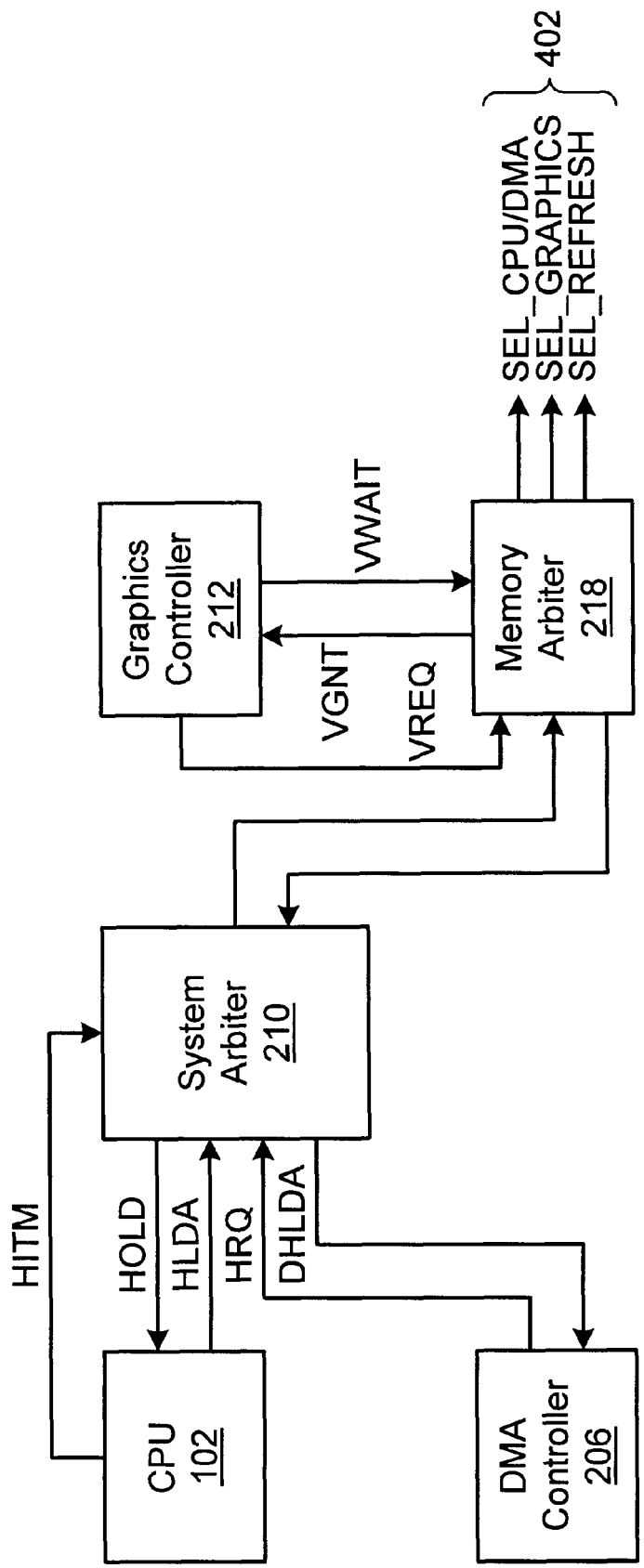
FIG. 4 is a detailed block diagram of the arbitration logic of the computer system of FIG. 2.

Referring now to FIG. 4, a detailed illustration of the bus arbitration system for computer system 200 is illustrated. System arbiter 210 arbitrates between CPU 202 and DMA controller 206 for access to the system memory 222. For system arbiter 210, the CPU 202 is the default bus owner. DMA controller 206 requests bus access by asserting the HRQ signal to system arbiter 210. To obtain bus access for DMA controller 206 the system arbiter 210 asserts the HOLD signal to CPU 202. When the CPU 202 finishes its current transaction, it asserts the HLDA signal to the system arbiter 210 to indicate that it is relinquishing control of the bus. System arbiter 210 then asserts the bus request to the memory arbiter 218.

Memory arbiter 218 arbitrates between the winner (DMA controller 206 or CPU 202) from system arbiter 210 and graphics controller 212 for access to the unified system memory 222 on high-speed data bus 228. Thus, a device cannot obtain access to unified system memory 222 until both levels of arbitration have been completed and the device receives a bus grant indication.

Graphics controller 212 is given priority over requests from the CPU 202 or DMA controller 206 in order to ensure that a glitch free screen display is maintained. Graphics controller 212 asserts the VREQ to memory arbiter 218 in order to request access to system memory 222. If high-speed data bus 228 is currently idle, then memory arbiter 218 will assert the VGNT signal to graphics controller 222, and then assert the SEL_GRAPHICS signal to the control logic 216, in order to indicate that the graphics controller 212 should be granted access to high-speed data bus 228. If high-speed data bus 228 is not idle when graphics controller 212 asserts the VREQ signal then memory arbiter 218 waits until the current transaction is completed on high-speed data bus 228, then removes bus ownership from the current bus owner and asserts the VGNT signal to award bus ownership to graphics controller 212.

If a bus request is received by memory arbiter 218 from system arbiter 210 (from CPU 202 or DMA controller 206) while graphics controller 212 has ownership of the high-speed data bus 228, then the memory arbiter 218 will wait until graphics controller 212 deasserts the VREQ signal before awarding ownership to the device request from system arbiter 210. In this case, memory arbiter 218 waits for deassertion of the VREQ from graphics controller 212 in order to allow graphics controller 212 to complete its current screen refresh operation in order to ensure that a glitch free screen image is maintained on the external monitor. Memory arbiter 218 generates control signals 402 to the control logic 216 to indicate which bus device should be granted control of the high-speed data bus 228, and to indicate the proper configuration for data steering logic 220. Control logic 216 then issues the appropriate control signals to data steering logic 220 and to the necessary components of computer system 200.

Referring back to FIG. 2, it is seen that CPU 202, graphics controller 212, and DMA controller 206 all compete for access to the unified system memory 222 through the high-speed data bus 228. Since only one of these devices may access the unified memory 222 through the high-speed data bus 228 at a time, performance is greatly enhanced by data steering logic 220, which allows the CPU and DMA controller to perform data transactions with devices on slow-speed bus 224 or PC Cores/Registers 208 concurrent with data transfers performed between graphics controller 212 and system memory 222. However, in many applications, the CPU 202, DMA controller 206 and graphics controller 212 will all need to access unified system memory 222 frequently so that one or more of these devices will be waiting for access to the unified system memory 222. To alleviate such bottlenecks, a preferred embodiment of the present invention includes a cache 204 within CPU 202.

Cache 204 allows CPU 202 to continue operations during times that graphics controller 212 has ownership of high-speed data bus 228. Cache 204 has a small high-speed memory which stores copies of data stored in unified system memory 222. CPU 202 can read the data stored in cache 204 without needing to access unified system memory 222 as long as the desired data is present within cache 204. When the desired data is not present within cache 204, then CPU 202 must compete for access to the high-speed data bus 228 by way of the arbitration system described above. Cache 204 improves overall system performance by providing another source of transaction concurrency. CPU 202 may access data stored within cache 204 concurrently with graphics controller 212 or DMA controller 206 accessing data stored within unified system memory 222, since CPU accesses to the cache 204 do not involve the high-speed data bus 228. To avoid cache coherency problems the range of data accessed by graphics controller 212 within unified system memory 222 may be configured as non-cacheable or as write-through cacheable.

Furthermore, during DMA transfers initiated by DMA controller 206, the arbitration and control logic (system arbiter 210, memory arbiter 218 and control logic 216) must accommodate snoops of the cache 204 during the beginning of DMA cycles which are targeted to data stored within unified system memory 222, for embodiments employing a write-back cache for cache 204. During a snoop operation, if CPU 202 indicates that the data addressed by DMA controller 206 is present within write-back cache 204 and not valid within unified system memory 222, then the system arbiter 210 will back off DMA controller 206 and allow write-back cache 204 to update the memory location in unified system memory 222 with the correct data. Thereafter, system arbiter 210 will allow DMA controller 206 to proceed with the DMA transfer.

Another device used to improve concurrency in computer system 200 is FIFO 214 located within graphics controller 212 (FIG. 2). FIFO 214 is a "first in, first out" memory device that acts as a buffer between graphics controller 212 and the unified system memory 222. In normal operation, graphics controller 212 may rapidly fill FIFO 214 with screen image data accessed from unified system memory 222. When FIFO 214 is full, graphics controller 212 may then relinquish high-speed data bus 228 so that CPU 202 or DMA controller 206 may access the unified system memory 222. During times that graphics controller 212 relinquishes control of high-speed data bus 228 it operates on data out of FIFO 214. The size of FIFO 214 may be optimized to maximize performance. When CPU 202 and DMA controller 206 do not require use of high-speed data bus 228, graphics controller 212 may perform data transfers to fill FIFO 214. Depending upon the desired refresh rate for the screen image on the external monitor and the bandwidth requirements of CPU 202 and DMA controller 206, FIFO 214 may be sized so that bus latency is minimized without interrupting screen refreshes. Generally speaking, FIFO 214 within graphics controller 212 enhances overall system concurrency by allowing graphics controller 212 to access data from FIFO 214 while DMA controller 206 or CPU 202 concurrently accesses data in unified system memory 222.

In a preferred embodiment of the present invention, many of the functional units in computer system 200 are integrated into a single integrated circuit device represented by the functional units enclosed within dotted-line 240 as shown in FIG. 2. Thus, CPU 202, DMA controller 206, PC Cores/Registers 208, system arbiter 210, graphics controller 212, control logic 216 (including memory arbiter 218), and data steering logic 220 may be integrated into a single integrated circuit device. An integrated circuit device as represented by dotted-line 240 is suitable for computer systems requiring low-power, low-cost and low-area implementations.

The improved bus concurrency of the present invention provided by arbitration logic 210, 218 and data steering logic 220, combined with the use of unified system memory 222, allows the functional units shown in FIG. 2 within dotted-line 240 to be integrated into a single low-cost device without sacrificing performance. A low-cost integrated circuit device is obtained because only a single data interface to memory 222 is required, and thus only one memory control unit is required within control logic 216. Therefore, the overall external pin count and gate size of the integrated circuit device represented by dotted-line 240 is decreased compared to traditional computer architectures utilizing a separate graphics memory. Furthermore, the improved bus concurrency of the present invention allows overall system performance to be maintained nearer the levels of traditional computer architectures. Therefore, an integrated circuit device 240 according to the present invention may be suitable for high performance applications utilizing various modern operating systems.

Still referring to FIG. 2, integrated circuit device 240 couples to 16-bit high-speed data bus 228 and 16-bit slow-speed bus 224. In other embodiments of the present invention, integrated circuit device 240 may be optionally configured to combine data bus 228 and the data portion of bus 224 into a 32 bit data bus to support access to 32-bit memory and/or access to 32 bit peripheral busses, such as the VL bus or Peripheral Component Interconnect (PCI) bus.

Figure 5:
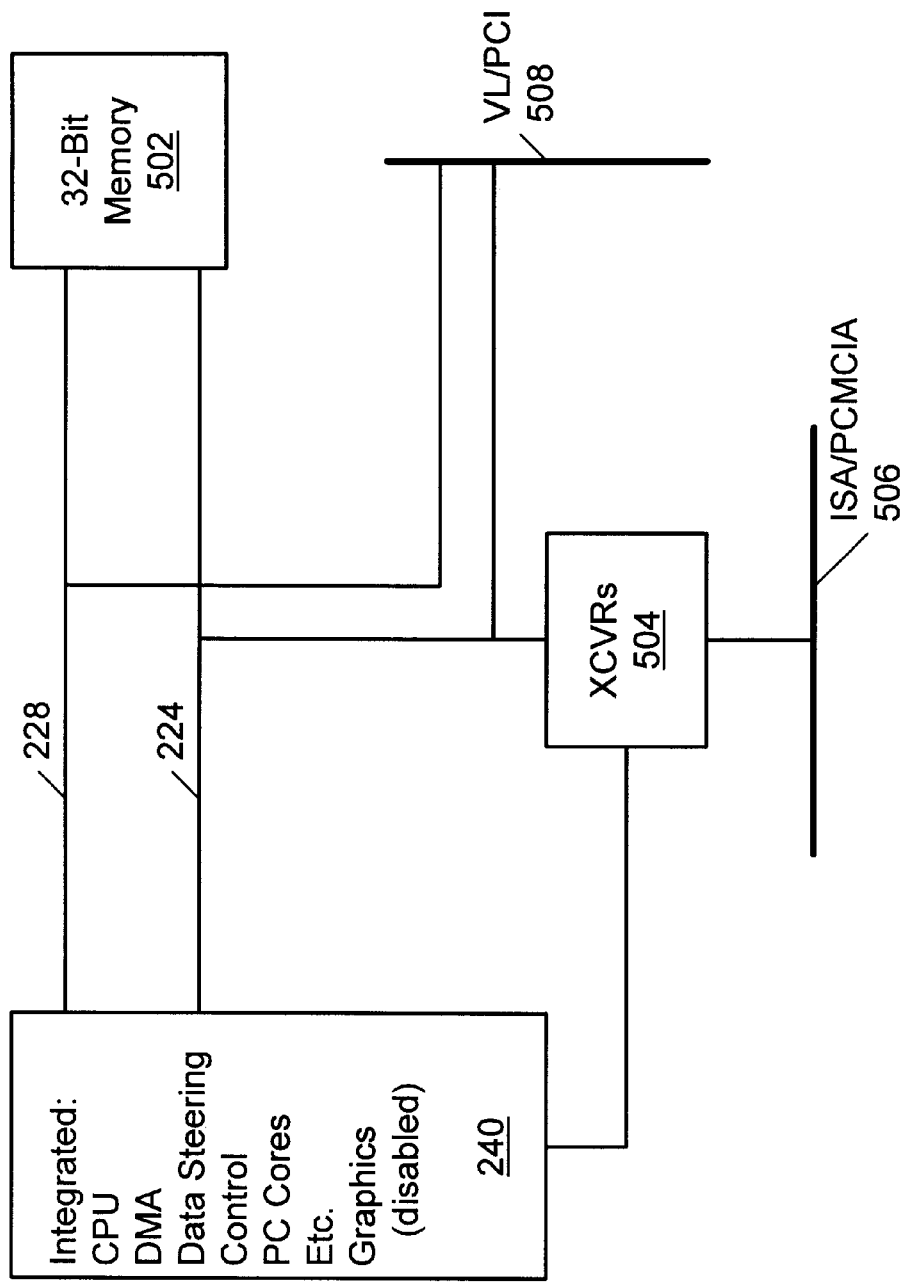
FIG. 5 is a block diagram illustrating one embodiment of the present invention allowing an alternative configuration to support a 32-bit external high-speed bus.

FIG. 5 illustrates a configuration of integrated circuit device 240 where data bus 228 and a data portion of bus 224 are combined to provide a 32-bit interface. When operating in such a 32-bit mode the graphics controller 212 within integrated circuit device 240 is disabled because the concurrent operations described above may no longer be performed since the full 32-bit data bus is required for all accesses to system memory 502. In this 32-bit configuration, the two data buses 224 and 228 are combined to provide 32-bit access to 32-bit memory 502. Also, the combined data buses 224 and 228 may support a 32-bit peripheral bus 508. Peripheral bus 508 may support bus devices according to standard bus specification such as the VL bus or the Peripheral Component Interconnect (PCI) bus. Also, a slower bus 506 may be supported in this configuration. The slower bus 506 may also support a standard bus specification such as the Industry Standard Architecture (ISA) bus or Personal Computer Memory Card International Association (PCMCIA) bus. Transceiver 504 may be required to buffer slower speed bus 506 from data bus 224 because of loading requirements. Transceiver 504 may also be required to isolate slower speed bus 506 during certain operations to prevent bus contention.

It will be appreciated to those skilled in the art having the benefit of this disclosure that this invention is believed to be capable of achieving a low-cost, low-area computer system with improved bus concurrency. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A computer system, comprising:

a central processing unit (CPU);

a graphics controller coupled to a first data bus;

system memory coupled to said first data bus, wherein data accessed by said CPU and data accessed by said graphics controller are both stored in said system memory;

data steering logic coupled to said first data bus, to a second data bus, and to said CPU, wherein said data steering logic is configured to selectively couple said CPU to a data bus selected from said first data bus and said second data bus, and wherein said data steering logic accommodates data transfers between said CPU and a device connected to said second data bus concurrent with data transfers between said graphics controller and said system memory, wherein said second data bus comprises an expansion data bus and said device comprises an expansion bus device; and memory arbitration logic coupled to said graphics controller and said CPU, wherein said memory arbitration logic is configured to arbitrate for access to said system memory.

2. The computer system as recited in claim 1, further comprising a direct memory access (DMA) controller operably coupled to said memory arbitration logic, wherein said memory arbitration logic and said data steering logic are configured to accommodate said DMA controller accessing said device on said second data bus concurrent with said graphics controller accessing said system memory.

3. The computer system as recited in claim 2, further comprising system arbitration logic coupled to said CPU and coupled to said DMA controller, wherein said system arbitration logic indicates to said memory arbitration logic a winner of arbitration between said CPU and said DMA controller, and wherein said memory arbitration logic arbitrates between said winner and said graphics controller for access to said system memory.

4. The computer system as recited in claim 3, wherein said system arbitration logic is configured to arbitrate between said CPU and said DMA controller with said CPU as default winner.

5. The computer system as recited in claim 3, wherein said memory arbitration logic is configured for said graphics controller to have arbitration priority over said winner.

6. The computer system as recited in claim 3, wherein said CPU comprises a cache memory configured to accommodate data transfers between said CPU and said cache memory concurrent with data transfers between said graphics controller and said system memory.

7. The computer system as recited in claim 6, wherein said system arbitration logic is configured to accommodate snoops of said cache memory during DMA controller accesses of said system memory.

8. The computer system as recited in claim 1, wherein said CPU comprises a cache memory configured to accommodate data transfers between said CPU and said cache memory concurrent with data transfers between said graphics controller and said system memory.

9. The computer system as recited in claim 1, wherein said graphics controller comprises a FIFO memory configured to accommodate data transfers between said graphics controller and said FIFO memory concurrent with data transfers between said CPU and said system memory.

10. The computer system as recited in claim 1, wherein said first data bus accommodates a higher data transfer bandwidth than said second data bus.

11. An integrated circuit device, comprising:

a central processing unit (CPU);

a graphics controller coupled to a first data bus, wherein said first data bus is configured to couple to a system memory external to the integrated circuit, and wherein data accessed by said CPU and data accessed by said graphics controller are both stored in said system memory;

data steering logic coupled to said first data bus, to a second data bus, and to said CPU, wherein said data steering logic is configured to selectively couple said CPU to a data bus selected from said first data bus and said second data bus, and wherein said data steering logic accommodates data transfers between said CPU and an external device coupled to said second data bus concurrent with data transfers between said graphics controller and said system memory, wherein said second data bus comprises an expansion data bus and said device comprises an expansion bus device; and memory arbitration logic coupled to said graphics controller and coupled to said CPU, wherein said memory arbitration logic is configured to arbitrate for access to said system memory.

12. The integrated circuit device as recited in claim 11, further comprising a direct memory access (DMA) controller operably coupled to said memory arbitration logic, wherein said memory arbitration logic and said data steering logic are configured to accommodate said DMA controller accessing said external device on said second data bus concurrent with said graphics controller accessing said system memory.

13. The integrated circuit device as recited in claim 12, further comprising system arbitration logic coupled to said CPU and coupled to said DMA controller, wherein said system arbitration logic indicates to said memory arbitration logic a winner of arbitration between said CPU and said DMA controller, and wherein said memory arbitration logic arbitrates between said winner and said graphics controller for access to said system memory.

14. The integrated circuit device as recited in claim 13, wherein said system arbitration logic is configured to arbitrate between said CPU and said DMA controller with said CPU as default winner.

15. The integrated circuit device as recited in claim 13, wherein said memory arbitration logic is configured for said graphics controller to have arbitration priority over said winner.

16. The integrated circuit device as recited in claim 11, wherein said CPU comprises a cache memory configured to accommodate data transfers between said CPU and said cache memory concurrent with data transfers between said graphics controller and said system memory.

17. The integrated circuit device as recited in claim 11, wherein said graphics controller comprises a FIFO memory configured to accommodate data transfers between said graphics controller and said FIFO memory concurrent with data transfers between said CPU and said system memory.

18. The integrated circuit device as recited in claim 11, further comprising a plurality of internal registers coupled to said data steering logic, wherein said data steering logic is further configured to accommodate data transfers between said CPU and said plurality of internal registers concurrent with data transfers between said graphics controller and said system memory.

19. The integrated circuit device as recited in claim 13, further comprising a plurality of internal registers coupled to said data steering logic, wherein said data steering logic is further configured to accommodate data transfers between said CPU and said plurality of internal registers concurrent with data transfers between said graphics controller and said system memory.

20. The integrated circuit device as recited in claim 13, further comprising bus controller logic configured to provide control signals supporting an ISA bus and a PCMCIA bus, wherein said second data bus provides the data signals for said ISA bus and said PCMCIA bus.

21. An integrated circuit, comprising:

data steering logic adapted for coupling to a first data bus, to a second data bus, and to a CPU, wherein said data steering logic is configured in a first mode to selectively couple said CPU to a data bus selected from said first data bus and said second data bus, and wherein said data steering logic accommodates data transfers between said CPU and a second device connected to said second data bus concurrent with data transfers between a first device and a system memory, wherein said first device and said system memory are connected to said first data bus, and wherein in said first mode said second data bus comprises an expansion data bus and said device comprises an expansion bus device; and memory arbitration logic adapted in said first mode for coupling to said first device and said CPU, wherein said memory arbitration logic is configured to arbitrate for access to said system memory.

22. The integrated circuit as recited in claim 21, further comprising a direct memory access (DMA) controller coupled to said memory arbitration logic, wherein said memory arbitration logic and said data steering logic are configured in said first mode to accommodate said DMA controller accessing said second device concurrent with said first device accessing said system memory.

23. The integrated circuit as recited in claim 21, wherein said data steering logic is configured in a second mode to couple said CPU to said first data bus and to said second data bus, wherein said data steering logic accommodates data transfers between said CPU and said system memory, wherein said system memory is connected to said first data bus and to said second data bus.

24. The integrated circuit as recited in claim 23, further comprising a direct memory access (DMA) controller coupled to said memory arbitration logic, wherein said memory arbitration logic is configured in said second mode to arbitrate between said CPU and said DMA controller for access to said system memory.

25. The integrated circuit as recited in claim 23, wherein said data steering logic accommodates data transfers having a first data width between said CPU and said system memory, and wherein said data steering logic accommodates data transfers having a second data width between said CPU and said system memory, wherein said second data width is twice said first data width.

26. A method for improving bus concurrency in a computer system, comprising:

providing a central processing unit (CPU);

providing a graphics controller coupled to a first data bus;

providing a unified system memory coupled to said first data bus;

providing an expansion bus device coupled to an expansion data bus;

steering data between said CPU and said bus device, wherein data transfers are accommodated between said CPU and said expansion bus device concurrent with data transfers between said graphics controller and said unified system memory; and arbitrating between said CPU and said graphics controller for access to said unified system memory.

* * * * *